United States Patent
Mucelli

(10) Patent No.: US 6,167,804 B1
(45) Date of Patent: Jan. 2, 2001

(54) METHOD FOR PERSONALIZING FLAT SUPPORTS

(75) Inventor: Alberto Mucelli, Calderara di Reno (IT)

(73) Assignee: C.I.M. Card Identification Machines S.p.A., Calderara di Reno (IT)

(*) Notice: Under 35 U.S.C. 154(b), the term of this patent shall be extended for 0 days.

(21) Appl. No.: 09/319,276

(22) PCT Filed: Dec. 4, 1997

(86) PCT No.: PCT/EP97/06797

§ 371 Date: Jul. 14, 1999

§ 102(e) Date: Jul. 14, 1999

(87) PCT Pub. No.: WO98/27512

PCT Pub. Date: Jun. 25, 1998

(30) Foreign Application Priority Data

Dec. 16, 1996 (IT) .............................................. VE96A0040

(51) Int. Cl.[7] .................................................. G06K 13/00
(52) U.S. Cl. .................................. 101/32; 101/4; 400/130
(58) Field of Search .................................. 101/4, 18, 32; 400/129, 130, 131, 134, 134.1, 134.2, 134.3

(56) References Cited

U.S. PATENT DOCUMENTS

| 3,029,920 | * | 4/1962 | Seifried | 400/130 |
| 3,820,455 | * | 6/1974 | Hencley et al. | 101/18 |
| 4,088,216 | * | 5/1978 | LaManna et al. | 101/18 |
| 4,441,831 | * | 4/1984 | Tipple et al. | 400/134.3 |
| 5,479,003 | * | 12/1995 | Yamada | 235/475 |

FOREIGN PATENT DOCUMENTS

| 0251637 | 1/1988 | (EP) . |
| 0296024 | 12/1988 | (EP) . |
| 0431172 | 6/1991 | (EP) . |
| 0440124 | 8/1991 | (EP) . |
| 01253495 | 10/1989 | (JP) . |

* cited by examiner

Primary Examiner—Kimberly Asher
Assistant Examiner—Leslie Grohusky
(74) Attorney, Agent, or Firm—Hoffman, Wasson & Gitler, PC

(57) ABSTRACT

A method for personalizing flat supports by embossing, characterized by comprising the following stages: withdrawing a card to be personalized from a holder, transferring the card into an embossing station in which a bar code is embossed corresponding to data to be personalized, transferring the embossed card to a bar code reading station, and verifying that the bar code data read in the reading station corresponds to the bar code data memorized in a control unit. If the bar code and memorized data does not correspond then the card is eliminated, while if the data does correspond, the card is returned to the embossing station for completing the embossing cycle by embossing the card with alphanumeric characters corresponding to the bar code characters.

4 Claims, 2 Drawing Sheets

METHOD FOR PERSONALIZING FLAT SUPPORTS

FIELD OF THE INVENTION

This invention relates to a method for personalizing flat supports, an apparatus for effecting the method, and a support obtained by the method.

DESCRIPTION OF THE PRIOR ART

Methods for personalizing metal or plastic cards by embossing alphanumerical characters are known.

These methods generally involve the use of a gripper which from a holder containing a plurality of stacked cards withdraws one card and transfers it into a position below an embossing unit which forms in relief a series of alphanumerical characters corresponding to the data to be personalized on the card, and also effects other possible processes to which the card has to be subjected.

With the increasing use of bar code readers in recent years, card personalizing methods have been proposed using a bar code. This system of personalization has however not been found to be reliable because it does not enable the correctness of the data transferred to the card to be checked after processing.

Moreover, attempts to personalize the card either by embossing alphanumerical data or by embossing data in bar code have encountered a considerable limitation because the card obtained may carry impressed alphanumerical data and bar code data not corresponding to the effective data to be personalized. Again, whereas incorrect cards can be eliminated by visual reading if in alphanumerical code, the same cannot be said if in bar code, which as stated cannot be checked.

To this must be added the fact that after the control system for the embossing unit has transferred the data to said unit, it generally eliminates the data from its memory, hence if the data embossed in bar code do not correspond to the alphanumerical data, not only is the card unusable but in addition the control system has to be reloaded with the data, with considerable time loss.

JP-A-1.253.495 discloses an apparatus for personalizing flat supports comprising a hopper, a printer, an embossing unit and a typing unit under the control of a controller.

The object of the invention is to eliminate these drawbacks by providing a method for personalizing a flat support which enables data to the embossed both in alphanumerical characters and in bar code, the method enabling the correctness of the embossed bar code data to be checked.

BRIEF SUMMARY OF THE INVENTION

This object and other ones are attained according to the invention through a method for personalizing flat supports by embossing, comprising the following stages:

withdrawing from a holder a card to be personalized, transferring said card into an embossing station in which a bar code is embossed corresponding to the data to be personalized, said data being memorized in a control unit, transferring said embossed card to a bar code reading station, verifying in the control unit that the bar code read in the reading station corresponds to the data memorized in the control unit, and if they do not correspond then eliminating said card, or if they do correspond then returning said card to said embossing station for completing the embossing cycle with the alphanumerical characters corresponding to the bar code characters as memorized in the control unit.

To effect the method an apparatus is provided comprising:

at least one container for a plurality of card a to be personalized, a same embossing unit both for alphanumerical characters and for bar code characters, a bar code reader, a discharge station, a station for feeding the cards to other processing stages, a movable member for transferring said card between said container, said embossing unit and one of said stations, a control unit.

BRIEF DESCRIPTION OF THE DRAWINGS

A preferred embodiment of the present invention is described in detail hereinafter with reference to the accompanying drawings, on which.

DESCRIPTION OF THE PREFERRED EMBODIMENT

Figure 1:
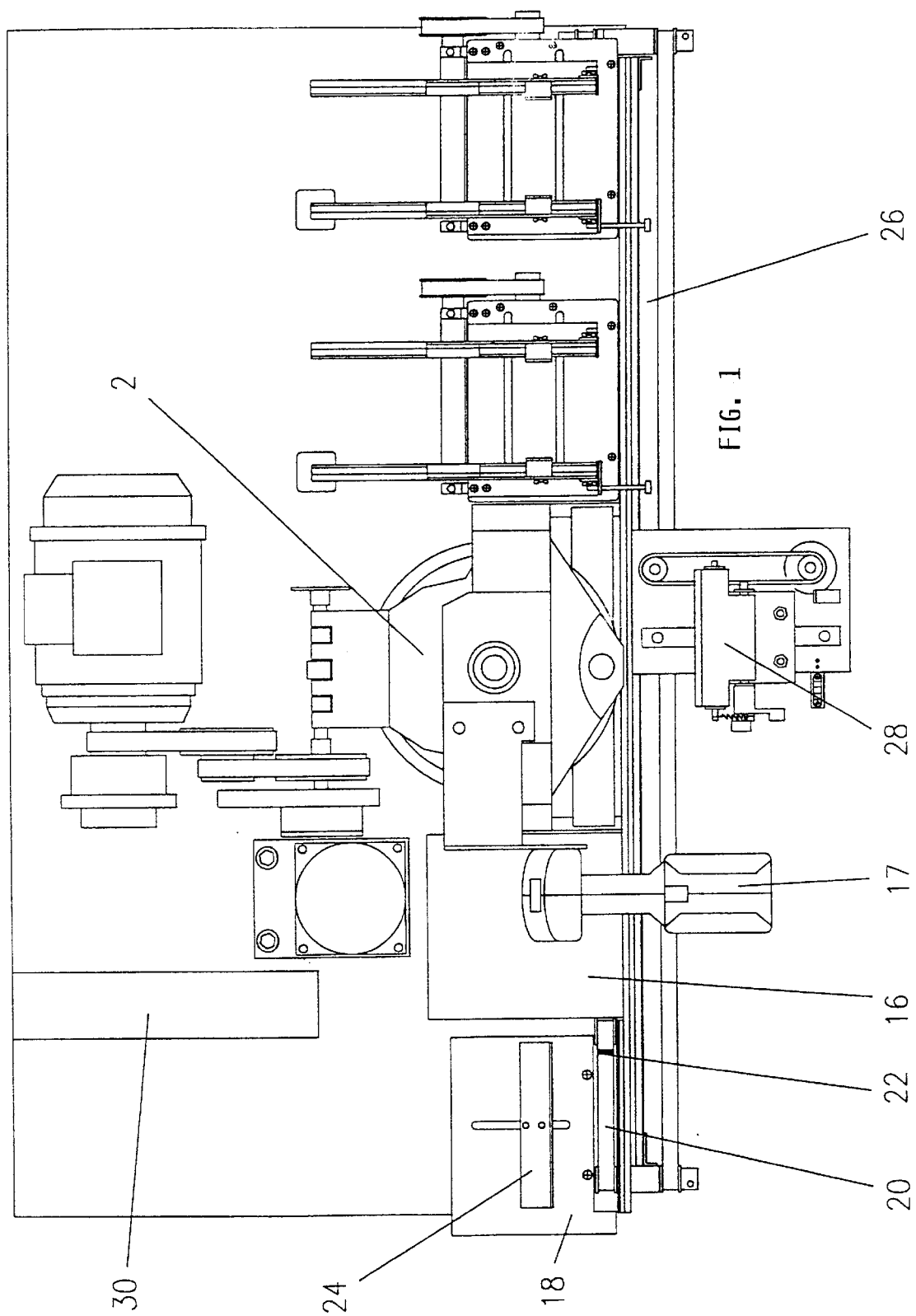
FIG. 1 is a schematic plan view form above showing an apparatus for implementing the method of the invention.
Figure 2:
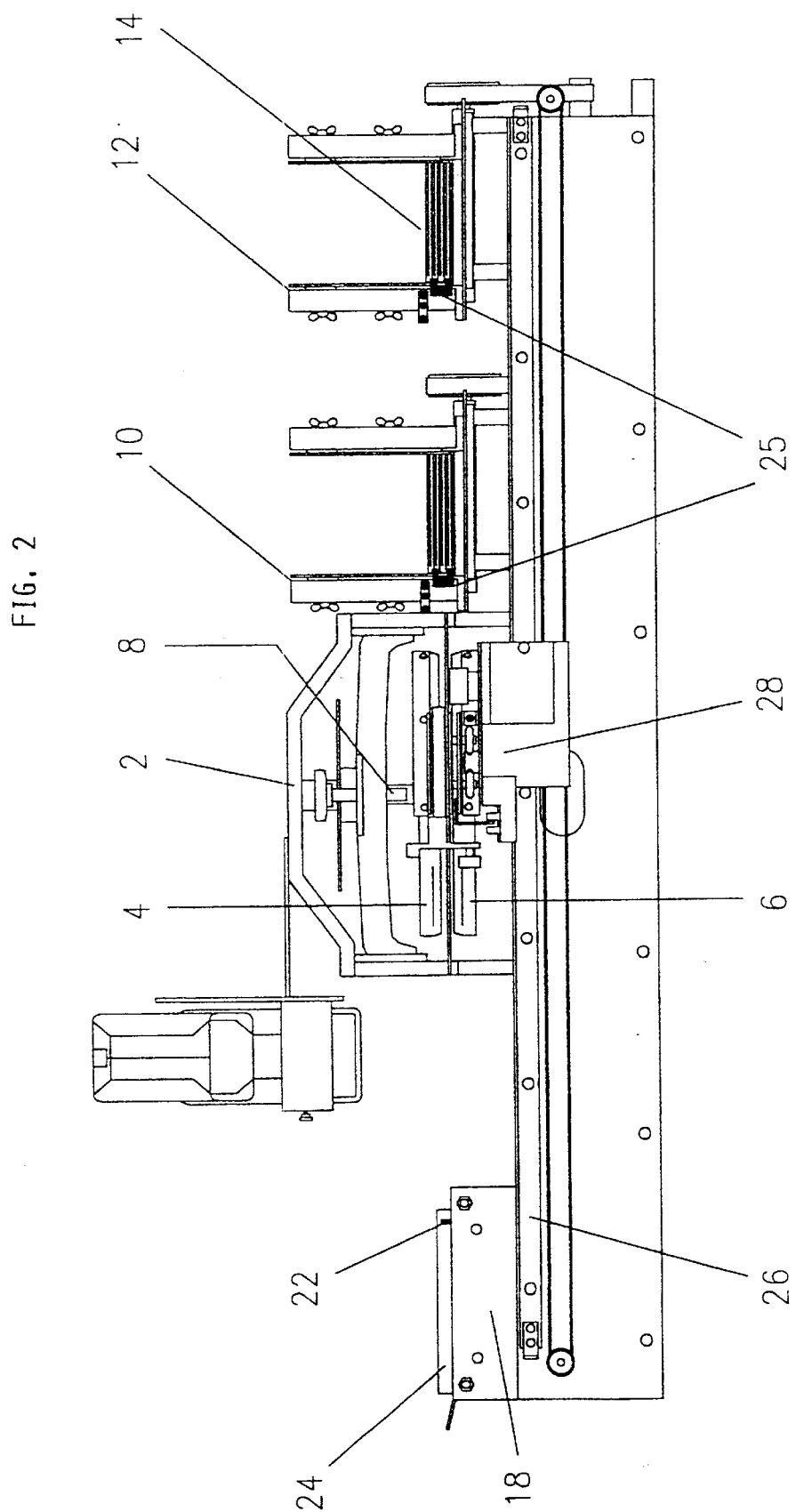
FIG. 2 is a side view thereof.

As can be seen from the figures, the method of the invention involves the use of an apparatus comprising substantially an embossing unit 2 consisting of two superposed rotatable discs 4,6, of which the upper disc 4 comprises a plurality of radial appendices carrying impressions corresponding to the overlying reliefs.

Operating hammers 8 are provided in a position above the upper disc 4 and below the lower disc 6.

To the side of said unit there are provided two containers 10,12 for a plurality of stacked cards 14, the width of the cards in one container being different from the width of the cards in the other container. On that side of the embossing unit distant from the containers there is provided a discharge tray 16 with an overlying optical reader 17, to the side of these there being provided a station 18 for feeding the card to the subsequent processing stages. Said station consists of an advancement belt 20 provided with a dragging tooth 22. In said station there is also provided a movable side wall 24 with its operating device regulated by a group of photoelectric cells 25 provided in correspondence with the card containers 10,12.

The loading containers 10,12, the embossing unit 2, the discharge tray 16 and the station 18 are longitudinally aligned, there being provided parallel to said components a guide 26 on which there is slidingly mounted a gripper 28, which is also movable transversely to the slide.

Finally the apparatus comprises a unit 30 for controlling and handling the various operations such as the rotation of the discs 4,6, the operation of the hammers 8, the movement of the gripper 28, the operation of the belt 20, the movement of the movable side wall 24, etc.

The apparatus also comprises a plurality of operating members (motors, actuators, etc.), transmission members and automatic devices (switches, counters, various controls, etc.) for effecting the automatic processing cycle, but which have not been illustrated or described for simplicity, they will however be referred to in the course of the following description by a simply mentioning their presence, they being of traditional type and as such known to an expert of the art.

The apparatus of the invention operates as follows:

After bringing the gripper 28 into a position facing one of the two loading containers 10,12, a pusher member (not shown on the drawings) inserts the lower card of the stack between the jaws of the gripper, which then moves along the guide 26 to position the card between the two discs 4,6 of the embossing unit 2.

During this withdrawal stage the group of photoelectric cells 25 measures the width dimension of the card, the control unit 30 then causing the side wall 24 of the discharge station to move in order to adapt to this dimension.

On the basis of the information received the unit 30 then causes the discs to rotate so that by acting on the radial appendices, the hammers 8 punch a bar code.

On termination of this stage the gripper 28 advances along the guide 26 and positions the card above the discharge tray 16 and below the optical reader 17, which reads the bar code embossed into the card and feeds the reading to the control unit for comparison with the memorized data. If the bar code embossed into the card and the data memorized in the control unit do not coincide, this latter causes the gripper to slacken its jaws so that the card falls into the discharge tray 16. If however the data coincide, the control unit causes the gripper to reposition the card in the embossing unit where the alphanumerical characters corresponding to the data already embossed in bar code are now embossed.

On termination of this operation the gripper transfers the card to the discharge station 18 where, as already stated, the movable side wall 24 has been shifted to a distance such as to form a stop for the transverse movement of the card and its consequent resting against the advancement belt.

From the a foregoing it is apparent that the method of the invention has numerous advantages, and in particular:

it enables the correctness of the data impressed in bar code to be verified, it provides reliable correlation between the data impressed in alphanumerical characters and the data impressed in bar code, it effects these operations in a reliable manner.

What is claimed is:

1. A method for personalizing flat supports by embossing same, said method comprising the steps of:
    a) inserting the flat supports into a holder,
    b) withdrawing an individual support to be personalized from said holder,
    c) transferring said support to an embossing station, said embossing station comprising a pair of rotatable discs and cooperating hammers,
    d) employing a first one of said discs and cooperating hammers to emboss a bar code into said support,
    e) transferring said embossed support to a bar code reading station wherein said bar code is read by an optical character reader,
    f) comparing the reading obtained by said optical reader with a value stored in a control unit, and, if coincidence is attained,
    g) returning said embossed support to said embossing station wherein said second one of said discs and said cooperating hammers apply alphanumeric characters to said embossed support,
    h) said alphanumeric characters corresponding to the value stored in said control unit.

2. A method of operating a system for personalizing flat supports by embossing same with alphanumeric characters and bar code characters in an automated manner, such system comprising:
    a) a holder for receiving a supply of flat supports,
    b) an embossing station comprising a pair of rotatable discs and cooperating hammers, the first one of said discs carrying embossing surfaces while the second of said discs carries alphanumeric characters,
    c) an optical character reading station,
    d) a movable member for withdrawing individual flat supports from said holder and transferring same to said embossing station and said optical character reading station, and
    e) a discharge station, downstream of said embossing station and said optical reading station,
    f) a control unit, with a memory, for operating said movable member to transfer individual flat supports between said holder, said embossing station, said reading station, and said discharge station,
    the method comprising the steps of:
    1) withdrawing an individual support to be personalized from said holder,
    2) transferring said support to said embossing station,
    3) embossing a bar code into said support by utilizing the first one of said discs and said cooperating hammers, said bar code corresponding to the data to be personalized,
    4) transferring said support, after embossing with said bar code, to said optical character reading station,
    5) optically reading said bar code, and
    6) comparing the data sensed by the optical reader with a value stored in said memory of said control unit, and, if coincidence is detected,
    7) returning the embossed support to said embossing station so that said second disc and said cooperating hammers apply alphanumeric characters to the support corresponding to the value stored in said memory of said control unit.

3. The method as defined in claim 2 further including:
    8) directing the embossed card to said discharge station if coincidence is not detected when the data sensed by said optical reader does not match the data stored in said memory of said control unit.

4. The method as defined in claim 2 wherein said alphanumeric characters are embossed onto said flat support by utilizing the second one of said discs and said cooperating hammers.

* * * * *